(12) United States Patent
Morin

(10) Patent No.: US 12,124,998 B2
(45) Date of Patent: *Oct. 22, 2024

(54) SYSTEMS AND METHODS TO GENERATE RECORDS WITHIN A COLLABORATION ENVIRONMENT

(71) Applicant: Asana, Inc., San Francisco, CA (US)

(72) Inventor: Steve B. Morin, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,712

(22) Filed: Sep. 28, 2023

(65) Prior Publication Data
US 2024/0029027 A1 Jan. 25, 2024

Related U.S. Application Data

(63) Continuation of application No. 17/674,473, filed on Feb. 17, 2022, now Pat. No. 11,836,681.

(51) Int. Cl.
| | | |
|---|---|---|
| *G06F 16/00* | (2019.01) | |
| *G06F 3/0486* | (2013.01) | |
| *G06F 40/40* | (2020.01) | |
| *G06Q 10/06* | (2023.01) | |
| *G06Q 10/10* | (2023.01) | |

(Continued)

(52) U.S. Cl.
CPC ......... *G06Q 10/103* (2013.01); *G06F 3/0486* (2013.01); *G06F 40/40* (2020.01); *G06Q 10/06* (2013.01); *G06T 7/33* (2017.01); *G10L 15/005* (2013.01)

(58) Field of Classification Search
CPC .... G06Q 10/103; G06Q 10/06; G06F 3/0486; G06F 40/40; G06T 7/33; G10L 15/005; G10L 15/26
See application file for complete search history.

(56) References Cited

U.S. PATENT DOCUMENTS

| | | | |
|---|---|---|---|
| 5,233,687 | A | 8/1993 | Henderson, Jr. |
| 5,524,077 | A | 6/1996 | Faaland |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

"U.S. Appl. No. 14/584,750, Examiner Interview Summary mailed Feb. 25, 2016", 3 pgs.

(Continued)

*Primary Examiner* — Noosha Arjomandi
(74) *Attorney, Agent, or Firm* — Esplin & Associates, PC

(57) ABSTRACT

Systems and methods to generate records within a collaboration environment are described herein. Exemplary implementations may perform one or more of: manage environment state information maintaining a collaboration environment; obtain input information defining digital assets representing sets of content input via a user interface; generate content information characterizing the sets of content represented in the digital assets; generate individual records based on the content information; and/or other operations.

20 Claims, 5 Drawing Sheets

(51) Int. Cl.
*G06T 7/33* (2017.01)
*G10L 15/00* (2013.01)

(56) References Cited

U.S. PATENT DOCUMENTS

| | | | |
|---|---|---|---|
| 5,530,861 | A | 6/1996 | Diamant |
| 5,608,898 | A | 3/1997 | Turpin |
| 5,611,076 | A | 3/1997 | Durflinger |
| 5,623,404 | A | 4/1997 | Collins |
| 5,721,770 | A | 2/1998 | Kohler |
| 5,983,277 | A | 11/1999 | Heile |
| 6,024,093 | A | 2/2000 | Cron |
| 6,256,651 | B1 | 7/2001 | Tuli |
| 6,292,830 | B1 | 9/2001 | Taylor |
| 6,332,147 | B1 | 12/2001 | Moran |
| 6,385,639 | B1 | 5/2002 | Togawa |
| 6,621,505 | B1 | 9/2003 | Beauchamp |
| 6,629,081 | B1 | 9/2003 | Cornelius |
| 6,769,013 | B2 | 7/2004 | Frees |
| 6,859,523 | B1 | 2/2005 | Jilk |
| 7,020,697 | B1 | 3/2006 | Goodman |
| 7,039,596 | B1 | 5/2006 | Lu |
| 7,086,062 | B1 | 8/2006 | Faour |
| 7,213,051 | B2 | 5/2007 | Zhu |
| 7,349,920 | B1 | 3/2008 | Feinberg |
| 7,418,482 | B1 | 8/2008 | Lusher |
| 7,428,723 | B2 | 9/2008 | Greene |
| 7,640,511 | B1 | 12/2009 | Keel |
| 7,676,542 | B2 | 3/2010 | Moser |
| 7,779,039 | B2 | 8/2010 | Weissman |
| 7,805,327 | B1 | 9/2010 | Schulz |
| RE41,848 | E | 10/2010 | Daniell |
| 7,844,454 | B2 | 11/2010 | Coles |
| 7,917,855 | B1 | 3/2011 | Satish |
| 7,996,744 | B2 | 8/2011 | Ojala |
| 7,996,774 | B1 | 8/2011 | Sidenur |
| 8,214,747 | B2 | 7/2012 | Yankovich |
| 8,314,809 | B1 | 11/2012 | Grabowski |
| 8,499,300 | B2 | 7/2013 | Zimberg |
| 8,522,240 | B1 | 8/2013 | Merwarth |
| 8,527,287 | B1 | 9/2013 | Bhatia |
| 8,554,832 | B1 | 10/2013 | Moskovitz |
| 8,572,477 | B1 | 10/2013 | Moskovitz |
| 8,627,199 | B1 | 1/2014 | Handley |
| 8,639,552 | B1 | 1/2014 | Chen |
| 8,768,751 | B2 | 7/2014 | Jakowski |
| 8,831,879 | B2 | 9/2014 | Stamm |
| 8,843,832 | B2 | 9/2014 | Frields |
| 8,863,021 | B1 | 10/2014 | Bee |
| 9,009,096 | B2 | 4/2015 | Pinckney |
| 9,024,752 | B1 | 5/2015 | Tumayan |
| 9,143,839 | B2 | 9/2015 | Reisman |
| 9,152,668 | B1 | 10/2015 | Moskovitz |
| 9,201,952 | B1 | 12/2015 | Chau |
| 9,208,262 | B2 | 12/2015 | Bechtel |
| 9,251,484 | B2 | 2/2016 | Cantor |
| 9,299,039 | B1 | 3/2016 | Wang |
| 9,350,560 | B2 | 5/2016 | Hupfer |
| 9,383,917 | B2 | 7/2016 | Mouton |
| 9,405,532 | B1 | 8/2016 | Sullivan |
| 9,405,810 | B2 | 8/2016 | Smith |
| 9,454,623 | B1 | 9/2016 | Kaptsan |
| 9,514,424 | B2 | 12/2016 | Kleinbart |
| 9,600,136 | B1 | 3/2017 | Yang |
| 9,674,361 | B2 | 6/2017 | Ristock |
| 9,712,576 | B1 | 7/2017 | Gill |
| 9,785,445 | B2 | 10/2017 | Mitsui |
| 9,830,398 | B2 | 11/2017 | Schneider |
| 9,842,312 | B1 | 12/2017 | Rosati |
| 9,949,681 | B2 | 4/2018 | Badenes |
| 9,953,282 | B2 | 4/2018 | Shaouy |
| 9,959,420 | B2 | 5/2018 | Kiang |
| 9,978,040 | B2 | 5/2018 | Lee |
| 9,990,636 | B1 | 6/2018 | Lewis |
| 10,001,911 | B2 | 6/2018 | Breedvelt-Schouten |
| 10,003,693 | B2 | 6/2018 | Wolthuis |
| 10,083,412 | B2 | 9/2018 | Suntinger |
| 10,157,355 | B2 | 12/2018 | Johnson |
| 10,171,256 | B2 | 1/2019 | Faulkner |
| 10,192,181 | B2 | 1/2019 | Katkar |
| 10,235,156 | B2 | 3/2019 | Johnson |
| 10,264,067 | B2 | 4/2019 | Subramani |
| 10,308,992 | B2 | 6/2019 | Chauvin |
| 10,373,084 | B2 | 8/2019 | Kurjanowicz |
| 10,373,090 | B2 | 8/2019 | Holm |
| 10,382,501 | B2 | 8/2019 | Malatesha |
| 10,455,011 | B2 | 10/2019 | Kendall |
| 10,496,943 | B2 | 12/2019 | De |
| 10,594,788 | B2 | 3/2020 | Larabie-Belanger |
| 10,606,859 | B2 | 3/2020 | Smith |
| 10,613,735 | B1 | 4/2020 | Karpe |
| 10,616,151 | B1* | 4/2020 | Cameron ............... H04L 51/04 |
| 10,623,359 | B1 | 4/2020 | Rosenstein |
| 10,657,501 | B2 | 5/2020 | Choi |
| 10,671,692 | B2 | 6/2020 | Koopman |
| 10,684,870 | B1 | 6/2020 | Sabo |
| 10,706,484 | B1 | 7/2020 | Murnock |
| 10,785,046 | B1 | 9/2020 | Raghavan |
| 10,810,222 | B2 | 10/2020 | Koch |
| 10,846,105 | B2 | 11/2020 | Granot |
| 10,846,297 | B2 | 11/2020 | Smith |
| 10,871,987 | B1 | 12/2020 | Bhalla |
| 10,922,104 | B2 | 2/2021 | Sabo |
| 10,956,845 | B1 | 3/2021 | Sabo |
| 10,970,299 | B2 | 4/2021 | Smith |
| 10,977,434 | B2 | 4/2021 | Pelz |
| 10,983,685 | B2 | 4/2021 | Karpe |
| 11,062,270 | B2 | 7/2021 | Hilleli |
| 11,082,281 | B2 | 8/2021 | Rosenstein |
| 11,095,468 | B1 | 8/2021 | Pandey |
| 11,113,667 | B1 | 9/2021 | Jiang |
| 11,138,021 | B1 | 10/2021 | Rosenstein |
| 11,140,174 | B2 | 10/2021 | Patel |
| 11,144,854 | B1 | 10/2021 | Mouawad |
| 11,159,470 | B1 | 10/2021 | Botwick |
| 11,170,761 | B2 | 11/2021 | Thomson |
| 11,204,683 | B1* | 12/2021 | Sabo ..................... G06F 3/0482 |
| 11,212,242 | B2 | 12/2021 | Cameron |
| 11,263,228 | B2 | 3/2022 | Koch |
| 11,287,946 | B2* | 3/2022 | Jackson ................ G06F 3/0485 |
| 11,288,081 | B2 | 3/2022 | Sabo |
| 11,290,296 | B2 | 3/2022 | Raghavan |
| 11,327,645 | B2 | 5/2022 | Karpe |
| 11,341,444 | B2 | 5/2022 | Sabo |
| 11,341,445 | B1 | 5/2022 | Cheng |
| 11,449,836 | B1* | 9/2022 | Clifton .................. G06F 3/0482 |
| 11,496,711 | B1* | 11/2022 | Cronan .................. H04N 5/278 |
| 11,627,006 | B1 | 4/2023 | Chew |
| 11,676,107 | B1* | 6/2023 | Beauchamp ........... G06Q 10/06 |
| | | | 705/301 |
| 2002/0029294 | A1 | 3/2002 | Ueno |
| 2002/0062367 | A1 | 5/2002 | Debber |
| 2002/0065798 | A1 | 5/2002 | Bostleman |
| 2002/0082889 | A1 | 6/2002 | Oliver |
| 2002/0143594 | A1 | 10/2002 | Kroeger |
| 2003/0028595 | A1 | 2/2003 | Vogt |
| 2003/0036934 | A1 | 2/2003 | Ouchi |
| 2003/0041317 | A1 | 2/2003 | Sokolov |
| 2003/0065722 | A1 | 4/2003 | Ieperen |
| 2003/0097406 | A1 | 5/2003 | Stafford |
| 2003/0097410 | A1 | 5/2003 | Atkins |
| 2003/0126001 | A1 | 7/2003 | Northcutt |
| 2003/0200223 | A1 | 10/2003 | Hack |
| 2003/0225598 | A1 | 12/2003 | Yu |
| 2003/0233265 | A1 | 12/2003 | Lee |
| 2003/0233268 | A1 | 12/2003 | Taqbeem |
| 2004/0083448 | A1 | 4/2004 | Schulz |
| 2004/0093290 | A1 | 5/2004 | Doss |
| 2004/0093351 | A1 | 5/2004 | Lee |
| 2004/0098291 | A1 | 5/2004 | Newburn |
| 2004/0119752 | A1 | 6/2004 | Beringer |
| 2004/0125150 | A1 | 7/2004 | Adcock |
| 2004/0162833 | A1 | 8/2004 | Jones |
| 2004/0187089 | A1 | 9/2004 | Schulz |

(56) References Cited

U.S. PATENT DOCUMENTS

| | | |
|---|---|---|
| 2004/0207249 A1 | 10/2004 | Baumgartner |
| 2004/0210470 A1 | 10/2004 | Rusk |
| 2004/0230447 A1 | 11/2004 | Schwerin-Wenzel |
| 2004/0268451 A1 | 12/2004 | Robbin |
| 2005/0028158 A1 | 2/2005 | Ferguson |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0030992 A1* | 2/2006 | Iwatsuki ............... F16H 61/21 701/55 |
| 2006/0047454 A1 | 3/2006 | Tamaki |
| 2006/0075347 A1 | 4/2006 | Rehm |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016465 A1 | 1/2007 | Schaad |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0188901 A1 | 8/2007 | Heckerman |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0018835 A1 | 1/2009 | Cooper |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0089225 A1 | 4/2009 | Baier |
| 2009/0089682 A1 | 4/2009 | Baier |
| 2009/0089701 A1 | 4/2009 | Baier |
| 2009/0094623 A1 | 4/2009 | Chakra |
| 2009/0100340 A1 | 4/2009 | Paek |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2010/0332236 A1 | 12/2010 | Tan |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035925 A1 | 2/2012 | Friend |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0151311 A1 | 6/2012 | Mathai |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0024452 A1 | 1/2013 | Defusco |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |

(56) References Cited

U.S. PATENT DOCUMENTS

| | | |
|---|---|---|
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0318447 A1* | 11/2013 | DeLuca ............... G06Q 10/107 715/752 |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0026072 A1 | 1/2014 | Beaven |
| 2014/0028826 A1 | 1/2014 | Lee |
| 2014/0036639 A1 | 2/2014 | Boni |
| 2014/0039962 A1 | 2/2014 | Nudd |
| 2014/0040780 A1 | 2/2014 | Artzt |
| 2014/0040905 A1 | 2/2014 | Tsunoda |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0218372 A1 | 8/2014 | Missig |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0088499 A1 | 3/2015 | White |
| 2015/0100503 A1 | 4/2015 | Lobo |
| 2015/0113540 A1 | 4/2015 | Rabinovici |
| 2015/0134393 A1 | 5/2015 | De |
| 2015/0149540 A1 | 5/2015 | Barker |
| 2015/0153906 A1 | 6/2015 | Liao |
| 2015/0154291 A1 | 6/2015 | Shepherd |
| 2015/0169069 A1 | 6/2015 | Lo |
| 2015/0181020 A1 | 6/2015 | Fitzsimmons |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0027442 A1 | 1/2016 | Burton |
| 2016/0048408 A1 | 2/2016 | Madhu |
| 2016/0048786 A1 | 2/2016 | Fukuda |
| 2016/0048806 A1 | 2/2016 | Epson |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0162819 A1 | 6/2016 | Hakman |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Gabor |
| 2016/0189075 A1 | 6/2016 | Babb |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2016/0344678 A1 | 11/2016 | MacDonald |
| 2017/0004213 A1 | 1/2017 | Cunico |
| 2017/0004586 A1 | 1/2017 | Suzuki |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0048285 A1 | 2/2017 | Pearl |
| 2017/0061341 A1 | 3/2017 | Haas |
| 2017/0068933 A1 | 3/2017 | Norton |
| 2017/0093874 A1 | 3/2017 | Uthe |
| 2017/0097929 A1 | 4/2017 | Cecchi |
| 2017/0099296 A1 | 4/2017 | Fisher |
| 2017/0103054 A1 | 4/2017 | Dispezio |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0154024 A1 | 6/2017 | Subramanya |
| 2017/0161258 A1 | 6/2017 | Astigarraga |
| 2017/0177671 A1 | 6/2017 | Allgaier |
| 2017/0185592 A1 | 6/2017 | Frei |
| 2017/0192642 A1 | 7/2017 | Fishman |
| 2017/0193349 A1 | 7/2017 | Jothilingam |
| 2017/0206217 A1 | 7/2017 | Deshpande |
| 2017/0249577 A1 | 8/2017 | Nishikawa |
| 2017/0310716 A1 | 10/2017 | Lopez Venegas |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2017/0364866 A1 | 12/2017 | Steplyk |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0129995 A1 | 5/2018 | Fowler |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |

(56) References Cited

U.S. PATENT DOCUMENTS

| | | |
|---|---|---|
| 2018/0189706 A1 | 7/2018 | Newhouse |
| 2018/0189736 A1 | 7/2018 | Guo |
| 2018/0211223 A1 | 7/2018 | Jacobson |
| 2018/0225618 A1 | 8/2018 | Shaouy |
| 2018/0225795 A1 | 8/2018 | Napoli |
| 2018/0247352 A1 | 8/2018 | Rogers |
| 2018/0247648 A1 | 8/2018 | Nadimpalli |
| 2018/0260081 A1 | 9/2018 | Beaudoin |
| 2018/0262620 A1 | 9/2018 | Wolthuis |
| 2018/0285471 A1 | 10/2018 | Hao |
| 2018/0300305 A1 | 10/2018 | Lam |
| 2018/0316636 A1 | 11/2018 | Kamat |
| 2018/0331842 A1 | 11/2018 | Faulkner |
| 2018/0341903 A1 | 11/2018 | Keen |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0050811 A1 | 2/2019 | Kang |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0108834 A1 | 4/2019 | Nelson |
| 2019/0130355 A1 | 5/2019 | Gupta |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0258704 A1 | 8/2019 | Mertens |
| 2019/0258985 A1 | 8/2019 | Guastella |
| 2019/0265821 A1 | 8/2019 | Pearl |
| 2019/0272902 A1 | 9/2019 | Vozila |
| 2019/0295041 A1 | 9/2019 | Sim |
| 2019/0318321 A1 | 10/2019 | Lopez Venegas |
| 2019/0327103 A1 | 10/2019 | Niekrasz |
| 2019/0327362 A1 | 10/2019 | Herrin |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0362252 A1 | 11/2019 | Miller |
| 2019/0370320 A1 | 12/2019 | Kalra |
| 2020/0019907 A1 | 1/2020 | Notani |
| 2020/0052921 A1 | 2/2020 | Van Rensburg |
| 2020/0059539 A1 | 2/2020 | Wang |
| 2020/0065736 A1 | 2/2020 | Relangi |
| 2020/0074510 A1 * | 3/2020 | Corodimas .......... G06Q 10/101 |
| 2020/0104802 A1 | 4/2020 | Kundu |
| 2020/0118568 A1 | 4/2020 | Kudurshian |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0242540 A1 | 7/2020 | Rosati |
| 2020/0244611 A1 | 7/2020 | Rosenstein |
| 2020/0293975 A1 | 9/2020 | Faulkner |
| 2020/0328906 A1 | 10/2020 | Raghavan |
| 2020/0344253 A1 | 10/2020 | Kurup |
| 2020/0349178 A1 | 11/2020 | Raju |
| 2020/0349415 A1 | 11/2020 | Raju |
| 2020/0349614 A1 | 11/2020 | Batcha |
| 2020/0396184 A1 | 12/2020 | Perazzo |
| 2020/0403817 A1 | 12/2020 | Daredia |
| 2020/0403818 A1 | 12/2020 | Daredia |
| 2021/0004380 A1 | 1/2021 | Koch |
| 2021/0004381 A1 | 1/2021 | Smith |
| 2021/0089860 A1 | 3/2021 | Heere |
| 2021/0091969 A1 | 3/2021 | Bender |
| 2021/0097466 A1 | 4/2021 | Sabo |
| 2021/0097502 A1 | 4/2021 | Hilleli |
| 2021/0103451 A1 | 4/2021 | Sabo |
| 2021/0110347 A1 | 4/2021 | Khalil |
| 2021/0117479 A1 | 4/2021 | Liu |
| 2021/0133681 A1 | 5/2021 | Dhaliwal |
| 2021/0134289 A1 | 5/2021 | Ito |
| 2021/0134296 A1 | 5/2021 | Iturbe Desentis |
| 2021/0135959 A1 | 5/2021 | Ricks |
| 2021/0136012 A1 | 5/2021 | Barbitta |
| 2021/0182475 A1 | 6/2021 | Pelz |
| 2021/0201271 A1 | 7/2021 | Vukich |
| 2021/0209535 A1 | 7/2021 | Tezak |
| 2021/0209561 A1 | 7/2021 | Kishore |
| 2021/0216562 A1 | 7/2021 | Smith |
| 2021/0232282 A1 | 7/2021 | Karpe |
| 2021/0280169 A1 | 9/2021 | Suzuki |
| 2021/0287673 A1 | 9/2021 | Kaplan |
| 2021/0319408 A1 | 10/2021 | Jorasch |
| 2021/0320811 A1 | 10/2021 | Constantinides |
| 2021/0320891 A1 | 10/2021 | Rosenstein |
| 2021/0342786 A1 | 11/2021 | Jiang |
| 2021/0365862 A1 | 11/2021 | Doan |
| 2021/0366490 A1 | 11/2021 | Hsieh |
| 2021/0375289 A1 | 12/2021 | Zhu |
| 2021/0375291 A1 | 12/2021 | Zeng |
| 2021/0382734 A1 | 12/2021 | Rosenstein |
| 2022/0019320 A1 | 1/2022 | Sabo |
| 2022/0027834 A1 | 1/2022 | Zheng |
| 2022/0058548 A1 | 2/2022 | Garg |
| 2022/0058552 A1 | 2/2022 | Takahashi |
| 2022/0060345 A1 | 2/2022 | Wiener |
| 2022/0075792 A1 | 3/2022 | Koch |
| 2022/0078142 A1 | 3/2022 | Cameron |
| 2022/0158859 A1 * | 5/2022 | Raghavan ............... G06Q 10/10 |
| 2022/0198403 A1 | 6/2022 | Chen |
| 2022/0207489 A1 * | 6/2022 | Gupta ...................... H04N 7/15 |
| 2022/0377279 A1 * | 11/2022 | Cronan ............... H04L 12/1831 |
| 2023/0004727 A1 | 1/2023 | Oberoi |
| 2023/0029697 A1 | 2/2023 | Kruk |
| 2023/0071838 A1 * | 3/2023 | Hood ................. G06Q 10/1095 |
| 2023/0163988 A1 | 5/2023 | Wells |
| 2024/0028564 A1 | 1/2024 | Davies |

FOREIGN PATENT DOCUMENTS

| | | |
|---|---|---|
| CN | 102378975 B | 5/2015 |
| JP | 2011048532 A | 3/2011 |
| WO | 2015036817 A1 | 3/2015 |
| WO | 2015123751 A1 | 8/2015 |
| WO | 2020006634 A1 | 1/2020 |

OTHER PUBLICATIONS

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU (Year: 2017), 13 pages.

"Rules of Data Conversion from Document to Relational Databases", published: 2014, publisher: Future-processing, pp. 1-8 (Year: 2014).

(56) References Cited

OTHER PUBLICATIONS (Tiburca, Andrew) Best Team Calendar Applications for 2018-Toggl https://toggl.com/blog/best-team-calendar-applications-for-2018 (Year: 2017) 3 pages.
An innovative way for document and work item management in agile development process; May 10, 2013; IP.com; IPCOM000227667D. 5 pages.
Asana Demo and Product Tour, you tube excerpt, Dec. 7, 2017 https://www.youtube.com/watch?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios, youtube, excerpt, Aug. 1, 2019 https://www.youtube.com/watch?v=7XkNcfFDG6M (Year: 2019) (20 pages).
Asana YouTube channel, list of all product videos, Nov. 19th 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana,Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).
Assef, F., Cassius, T. S., & Maria, T. S. (2018). Confrontation between techniques of time measurement. Journal of Manufacturing Technology Management, 29(5), 789-810. (Year: 2018).
Biggs, "GateGuru Relaunches With New Ways to Streamline Your Travel Experience", Techcrunch, (Apr. 26, 2013), 3 pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
Command and control, wikipedia, archives org, Mar. 16, 2018 https://web.archive.org/web/20180316193655/https://en.wikipedia.org/wiki/Command_and_control (Year: 2018), 6 pages.
Creating Tables with Fields from 2 Different Tables, published: 2009, publisher: StackOverflow, pp. 1-2. (Year: 2009).
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.
Dawei Li, "Deepcham: Collaborative Edge-Mediated Adaptive Deep Learning for Mobile Object Recognition", 2016, IEEE/ACM, pp. 64-76. (Year: 2016).
Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.
Hartmann, "TimeProjectscheduling with resource capacities and requests varying with time: a case study," 2013, Flexible services and manufacturing journal, vol. 25, No. 1, pp. 74-93 (Year: 2013).
Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv3o (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).
Paul Minors, How to automate your tasks, youtube excerpts, Oct. 18, 2019 https://www.youtube.com/watch? v=lwF9XyUQrzw (Year: 2019).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Sarikaya, Ruhi. "The technology behind personal digital assistants: An overview of the system architecture and key components." IEEE Signal Processing Magazine 34.1 (2017): 67-81. (Year: 2017).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https://web.archive.org/web/20160101054527/https://asana.com/product) (Year: 2016) 15 pages.
www.cogmotive.com/blog/author/alan Alan Byrne: "Creating a company Shared Calendar in Office 365"; pp. 1-17; Sep. 10, 2013 (16 pages).
Cabanillas, Cristina, Manuel Resinas, and Antonio Ruiz-Cortés. "A template-based approach for responsibility management in executable business processes." Enterprise information systems 12.5 (2018): 550-586. (Year: 2018).
Nanos, Antonios G., and Anne E. James. "A virtual meeting system for the new age." 2013 IEEE 10th International Conference on e-Business Engineering. IEEE, 2013. (Year: 2013).

(56) References Cited

OTHER PUBLICATIONS

Shi, Yang, et al. "Meetingvis: Visual narratives to assist in recalling meeting context and content." IEEE Transactions on Visualization and Computer Graphics 24.6 (2018): 1918-1929. (Year: 2018).

* cited by examiner

SYSTEMS AND METHODS TO GENERATE RECORDS WITHIN A COLLABORATION ENVIRONMENT

FIELD OF THE DISCLOSURE

The present disclosure relates to systems and methods to generate records within a collaboration environment.

BACKGROUND

Collaboration environments, sometimes referred to as work management platforms, may enable users to assign projects, tasks, or other assignments to assignees (e.g., other users) to complete. A collaboration environment may comprise an environment in which individual users and/or a virtual team of users does its work and may enable users to work in a more organized and efficient manner.

SUMMARY

Hosting a web-based collaboration environment poses many challenges. For example, operating the collaboration environment may require precise ways of creation, storage, management, and/or provision of information that makes up the collaboration environment. One way that operators look to improve the operation of the collaboration environment is to improve parts of the collaboration environment involving substantial human-machine interaction. For example, users may traditionally manually generate work unit records for units of work within the collaboration environment. The operators of the collaboration environment were traditionally tasked with finding ways to design and configure user interfaces which would provide user-friendly and intuitive ways to receive this manual input. However, even with improved user interfaces that walk through manual generation of work unit records and/or other records, the requirement for human-machine interactions is time consuming, may cause decreased workflow efficiency, and/or may be prone to user error.

One aspect of the present disclosure relates to generating work unit records and/or other records within a collaboration environment. The inventors of the present disclosure have also identified that records are often created by the users from some reference material. For example, after a recorded meeting, a user may generate one or more records that reflect the work to be done following the recording. Further, a user may make notes on a word document (e.g., either a digital or physical document such as a note pad), which is then used as a reference to create one or more records. Manually generating records may be time consuming, may decrease workflow efficiency, and the detailed requirements for creation of the records in the collaboration environment may be affected by user error. To address these and/or other problems, one or more implementations presented herein propose a technique to automatically generate records. The records may be automatically generated from digital assets the user uploads, and/or from other content. By way of non-limiting illustration, a user may upload a digital asset (e.g., image files, video files, audio files, and/or other assets) into a user interface. The digital assets may include some unstructured content. "Unstructured" may refer to the content not being originally organized in a manner that conforms to the data structure of a work unit record. The system may carry one or more processing techniques to extract the content from the digital assets and structure the content into a format that facilitates creation of records. By way of non-limiting illustration, the content may be parsed to identify values of parameters that make up a work unit record and/or other record. In some implementations, when a record is generated, one or more fields may be automatically filled based on context surrounding the uploaded asset(s).

One or more implementations of a system to generate records within a collaboration environment may include one or more hardware processors configured by machine-readable instructions and/or other components. Executing the machine-readable instructions may cause the one or more hardware processors to facilitate generating records within a collaboration environment. The machine-readable instructions may include one or more computer program components. The one or more computer program components may include one or more of an environment state component, a user interface component, a content component, a work creation component, and/or other components.

The environment state component may be configured to manage environment state information maintaining a collaboration environment. The collaboration environment may be configured to facilitate interaction by users with the collaboration environment. The environment state information may include one or more records. The one or more records may include one or more of work units records, project records, objective records, and/or other records. The work unit records may include work information and/or other information. The work information may characterize units of work created, managed, and/or assigned to within the collaboration environment to the users who are expected to accomplish one or more actions to complete the units of work. The work information may comprise values of work unit parameters characterizing the units of work.

The user interface component may be configured to effectuate presentation of a user interface through which users upload digital assets representing sets of content. The user interface may include one or more portions. The one or more portions may include an input portion. The input portion may be configured to receive user input of individual ones of the digital assets.

The user interface component may be configured to obtain input information defining the digital assets input via the user interface. The input information may define a first digital asset input into the user interface via the input portion. The first digital asset may present a first set of content.

In some implementations, the content component may be configured to, in response to obtaining the input information, generate content information characterizing the sets of content represented in the digital assets. By way of non-limiting illustration, responsive to obtaining the input information defining the first digital asset, the content component may be configured to generate first content information characterizing the first set of content of the first digital asset.

The work creation component may be configured to generate individual records based on the content information and/or other information. The individual records may be generated by determining sets of values for parameters. The sets of values may be determined from the characterization of the sets of content represented in the digital assets, and/or other information. By way of non-limiting illustration, a first work unit record may be generated based on the first content information and/or other information. The first work unit record may include a first set of values for the work unit parameters determined from the characterization of the first set of content.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents unless the context clearly dictates otherwise.

DETAILED DESCRIPTION

Figure 1:
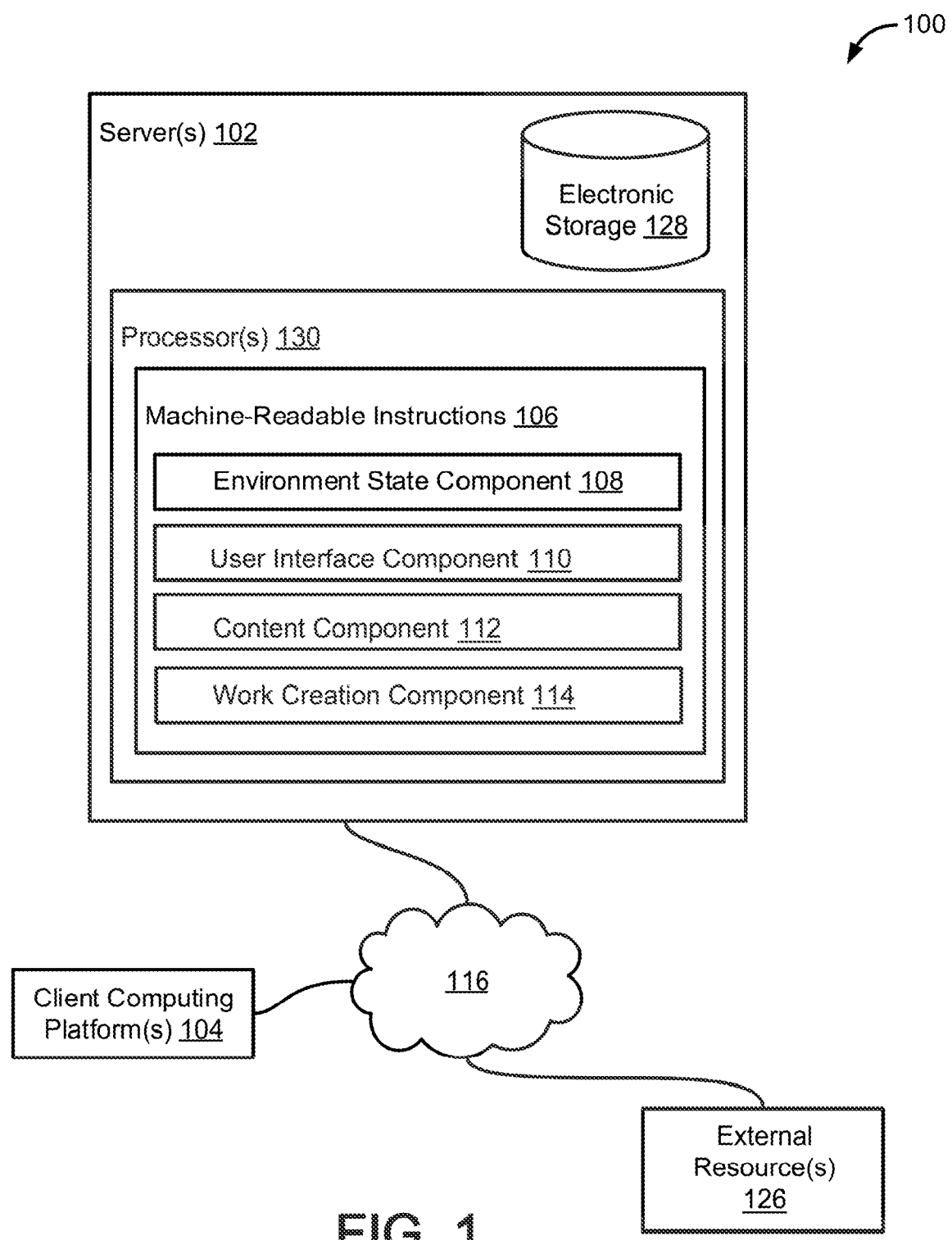
FIG. 1 illustrates a system configured to generate records within a collaboration environment, in accordance with one or more implementations.

FIG. 1 illustrates a system 100 configured to generate records within a collaboration environment, in accordance with one or more implementations. Often, records may be created from some reference material. For example, after a recorded video or audio meeting or dictation, a user may generate one or more records that reflect the work to be done following the recording. Further, a user may make notes on a word document (e.g., either digital or physical document such as note pad), which is then used as a reference to create one or more records. One or more implementations presented herein propose a technique to automatically generate records. The records may be automatically generated from digital assets the user uploads, and/or from other content. The system 100 may carry one or more processing techniques to structure otherwise unstructured content from the digital assets.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate generating work unit records within a collaboration environment. The computer program components may include one or more of an environment state component 108, user interface component 110, a content component 112, work creation component 114, and/or other components.

Environment state component 108 may be configured to manage environment state information and/or other information used in maintaining a collaboration environment. The collaboration environment may be configured to facilitate interaction by users with the collaboration environment. The environment state information may include one or more records. The one or more records may include one or more of user records, work unit records, project records, objective records, and/or other records. The user records may include user information describing the users of the collaboration environment. The work unit records which may include work information describing units of work assigned to, created by, and/or managed by the users within the collaboration environment. The project records may include project information describing projects created, assigned, and/or managed within the collaboration environment. An individual project may include individual sets of the units of work supporting the individual projects. The objective records may include objective information describing business objectives specified within the collaboration environment.

The user information in the user records may include values of user parameters and/or other information. The values of the user parameters may be organized in the user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/ productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, and external resource may include a calendar application which may be external to a collaboration environment. The collaboration environment may have permissions to access the external calendar application to determine and/or obtain schedule information.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, objectives, and/or other units of work one or more users should accomplish and/or plan on accomplishing. Units of work may be created by a given user for the given user and/or created by the given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, the one or more work unit parameters may include one or more of a work assignment parameter, a work completion parameter, a work management parameter, a work creation parameter, a dependency parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a first unit of work may not be started until a second unit of work is completing, meaning the first unit of work is dependent on the second unit of work. In some implementations, values of the dependency parameter may go hand in hand with the hierarchical information. By way of non-limiting illustration, a unit of work that is subordinate to an other unit of work may be dependent on the other unit of work, or vice versa.

In some implementations, values of work unit parameters may include one or more of a unit of work name, a unit of work description, user role information, one or more unit of work dates (e.g., a start date, a due date or end date, a completion date, and/or dates), project inclusion (e.g., identification of projects supported by the individual units of work), one or more members associated with a unit of work (e.g., an owner, one or more collaborators, collaborator access information, and/or other unit of work collaborators, and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency, one or more custom fields (e.g., priority, cost, stage, and/or other custom fields), and/or other information.

The values of the work assignment parameter describing assignment of users to units of work may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects managed within the collaboration environment. The project parameters may characterize one or more projects created, assigned, and/or managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may include one or more units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client and the units of work under the individual project heading may be work directly contributing to the fulfillment of a business relationship with the client.

In some implementations, activities that impact the progress toward completion of the individual projects may be reflected by changes in the values of one or more of the work unit parameters and/or the values of one or more of the project parameters.

The values of the project parameters may, by way of non-limiting example, include one or more of: one or more units of work within individual ones of the projects (which may include values of work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators, and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, projects created by, assigned to, and/or completed by the users may refer generally to a linking of the projects with the individual users in the collaboration environment. A project may be linked with a user in a manner that defines one or more relationships between the user and the project. Such a relationship may connote and/or be a result of an action (past, present, and/or future) of the user with respect to the project. Such actions may include one or more of creating a project record for a project, being assigned to participate in a project, participating in a project, being granted access to a project record of a project, adjusting a value of a project parameter of a project record of a project, being assigned a project-level role, and/or other actions.

User role information may specify individual roles of the individual users. A role may represent a position of an individual user. The position may be specified based on a description of one or more of a job title, level, stage, and/or other descriptions of position. The role may be specified with respect to a business organization as a whole and/or other specifications. By way of non-limiting illustration, a role may include one or more of chief executive officer (or other officer), owner, manager, supervisor, accountant, associate, employee, intern, entry-level, midlevel, senior, administrator, director, foreman, engineer, product developer, human resource officer, artist, art director, and/or other descriptions.

In some implementations, user role information may specify roles of the users within the units of work and/or the projects. The roles may convey expected contribution of the users in completing and/or supporting the units of work and/or the projects. The individual roles of individual users within the units of work may be specified separately from the individual roles of the individual users within the projects. The individual roles of individual users within the units of work and/or projects may be specified separately from the individual roles of the individual users within a business organization as a whole.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and/or identify sets of work unit records and/or project records that support the individual business objectives.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

Progress information for the individual business objectives may convey progress toward fulfillment of the individual business objectives. The progress information for the individual business objectives may convey progress toward fulfillment of the individual business objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual business objectives may be determined independently from incremental completion of the units of work in the individual sets of units of work associated with the individual business objectives. Meaning, the completion of the units of work associated with a given business objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

It is noted that any metadata and/or values of parameters related to any users, projects, business objectives, and/or units of work may be considered values of user parameters, project parameters, objective parameters, and/or work unit parameters.

In some implementations, environment state component 108 may be configured to manage information defining work unit pages corresponding to the individual units of work. Individual work unit pages may provide access to individual units of work. Managing information defining work unit pages may include determining, obtaining, and/or modifying information used to generate work unit pages. Managing information defining individual work unit pages may include providing information to the user interface component 110 to effectuate presentation of the work unit pages, and/or other information. In some implementations, individual work unit pages may include individual sets of interface elements displaying the values of one or more of the work unit parameters of the individual units of work.

In some implementations, environment state component 108 may be configured to manage information defining project pages corresponding to the individual projects. Individual project pages may provide access to individual projects. Managing information defining project pages may include determining, obtaining, and/or modifying information used to generate project pages. Managing information defining individual project pages may include providing information to the user interface component 110 to effectuate presentation of the project pages, and/or other information. In some implementations, individual project pages may include individual sets of interface elements displaying the values of one or more of the project parameters of the individual projects.

In some implementations, environment state component 108 may be configured to manage information defining business objective pages corresponding to the individual business objectives. Individual business objective pages may provide access to individual business objectives. Managing information defining business objective pages may include determining, obtaining, and/or modifying information used to generate business objective pages. Managing information defining individual business objective pages may include providing information to the user interface component 110 to effectuate presentation of the business objective pages, and/or other information. In some implementations, individual business objective pages may include individual sets of interface elements displaying the values of one or more of the objective parameters of the individual business objectives.

The user interface component 110 may be configured to effectuate presentation of a user interface of the collaboration environment on client computing platform(s) 104. The user interface component 110 may facilitate server information from server(s) 102 to client computing platform(s) 104 so that client computing platform(s) 104 may present the user interface. The user interface may provide one or more views of the collaboration environment and/or provide other features and/or functionality. The one or more views may include one or more pages of the collaboration environment. In some implementations, an individual view of the collaboration environment may textually and/or graphically display information from one or more of a user record, a project record, an objective record, and/or other records. By way of non-limiting illustration, a view may display one or more of a work unit page, a project page, a business objective page, a queue of units of work, and/or other information.

The user interface component 110 may be configured to effectuate presentation of a user interface through which users input and/or upload digital assets representing sets of content. The sets of content represented in the digital assets may generally be unstructured content. "Unstructured" may mean that the content represented in the digital assets may be unusable by the collaboration environment unless and/or until it is structured in one form or another. The user interface may include one or more portions. A portion may include an input portion configured to receive user input of the digital assets. In some implementations, the input portion may be configured to receive user input through drag-and-drop input, file selection through a search and/or drop down menu, and/or other input.

The user interface component 110 may obtain input information conveying user input into a user interface. In some implementations, the input information may define individual ones of the digital assets input by the users via the user interface. By way of non-limiting illustration, the input information may include the data included in uploaded files. By way of non-limiting illustration, the input information may define a first digital asset input into the user interface via the input portion by a first user and/or other users. The first digital asset may represent a first set of content.

In some implementations, digital assets that users may input may include one or more of document files, image files, video files, audio files, and/or other digital assets representing sets of content.

In some implementations, content of document files may include one or more of text, figures, formulas, and/or other content. Text may comprise one or more of words, phrases, glyphs, and/or other content.

In some implementations, content of image files may include visual content. In some implementations, the visual content may include one or more of a photograph, a screenshot, and/or other visual content. The photographs may be of physical documents including typed and/or handwritten text, drawings, figures, people, and/or other content.

In some implementations, content of audio files may include audio content and/or other content. The audio content may include one or more of user utterances (e.g., speech, emotes, and/or other utterances), environment sounds, and/or other audio content.

In some implementations, content of video files may include one or more of visual content, audio content, and/or other content.

Content component 112 may be configured to generate content information characterizing the sets of content represented in the digital assets. In some implementations, content component 112 may be configured to generate content information characterizing the sets of content represented in the digital assets in response to obtaining the input information. In some implementations, content component 112 may be configured to generate content information characterizing the sets of content represented in the digital assets in response to specific user input requesting the generation of the content information following the input of the digital assets. By way of non-limiting illustration, responsive to obtaining the input information defining the first digital asset, content component 112 may be configured to generate first content information characterizing the first set of content.

In some implementations, generating the content information for document files may include performing natural language processing on text and/or other content in the document files.

In some implementations, generating the content information for image files may include performing feature detection on visual content. The feature detection may characterize features in the visual content. By way of non-limiting illustration, techniques for feature detection may include one or more of computer vision, Speeded Up Robust Features (SURF), Scale-invariant Feature Transform (SIFT), Oriented FAST and rotated BRIEF (ORB), Optical Character Recognition (OCR), facial recognition, and/or other techniques.

In some implementations, generating the content information for audio files may include performing speech processing on audio content and/or other processing. In some implementations, the speech processing may identify users, characterize user utterances in the audio content, and/or produce other output. By way of non-limiting illustration, the speech processing may determine user utterances (e.g., words and/or phrases spoken), identify users who are speaking, and/or other provide other information.

In some implementations, generating the content information for video files may include performing one or more of feature detection on the visual content to characterize features in the visual content, speech processing on audio content to characterize user utterances in the audio content, and/or other processing techniques.

The work creation component 114 may be configured to generate individual work unit records and/or other records based on content information and/or other information. The individual work unit record may be generated by determining work information describing the individual work unit records as part of the environment state information. Determining work information may include specifying values for one or more parameters. In some implementations, certain content may trigger generation of individual work unit records. By way of non-limiting illustration, in some implementations, certain content may trigger specification of one or more values of one or more parameters. Individual work unit records may be generated based on identifying one or more of the trigger included in sets of content of the digital assets.

It is noted that creation of work unit records based on content information is for illustrative purposes only and not to be considered limiting. In some implementations, work creation component 114 may be configured to generate other records based on content information and/or other information. By way of non-limiting illustration, work creation component 114 may be configured to generate one or more of project records, user records, objective records, and/or other records based on content information and/or other information. In some implementations, work creation component 114 may be configured to determine what type of record should be created based on the content information and/or other information. By way of non-limiting illustration, work creation component 114 may be configured to determine an intent of work from the content information and/or other information. Intent may be characterized as one or more of completing one or more to-do items and/or action items, organizing one or more to-do items and/or action items, high-level goal setting, user onboarding/user introductions, and/or other characteristics. In some implementations, completing one or more to-do items may be associated with work unit records and/or other records. In some implementations, organizing one or more to-do items may be associated with project records and/or other records. In some implementations, goal setting may be associated with objective records and/or other records. In some implementations, user onboarding may be associated with user records and/or other records. A project record may be generated by determining project information describing the project record as part of the environment state information. Determining project information may include specifying values for one or more parameters. An objective record may be generated by determining objective information describing the objective record as part of the environment state information. Determining objective information may include specifying values for one or more parameters. Accordingly, while one or more implementations described herein may be directed toward work unit records, those skilled in the art may appreciate that the features and/or functionally may be extended to creating other records.

The work creation component 114 may be configured to store trigger information. The trigger information may include triggers to generate work unit records and/or other records. In some implementations, triggers may be user-specific and/or system-wide. In some implementations, the triggers may be set by users and stored within the user records for the users. In some implementations, the work creation component 114 may be configured to determine triggers through one or more machine learning techniques.

In some implementations, triggers in text and/or user utterances may include trigger words and/or phrases. By way of non-limiting illustration, the trigger phrases and/or words may include words and/or phrases conveying one or more of action items or tasks to be completed, desires or wants, and/or other information. In some implementations, the trigger phrases and/or words may include words accompanied by one or more of will you, can you, could you, please, by a given date, before the given date, we need, I need, I want, would be grateful if, you could, and/or other phrases and/or words. By way of non-limiting illustration, text may include "The background research to be completed should help us determine the next course of action." An action item determined from this text may include "doing background research." Another action item determined from this text may include "determine next course of action." By way of non-limiting illustration, a user utterance may include "When Tom completes the background research, we will know the next course of action." A desire from this text may include "have Tom do the background research." In some implementations, the trigger phrases and/or words may be directly correlated to other existing records. By way of non-limiting illustration, a user utterance may specifically identify an existing record.

In some implementations, triggers in visual content of video files may include one or more trigger gestures and/or emotes. The trigger gestures and/or emotes may indicate a user's request, desire, inquiry, and/or need. By way of non-limiting illustration, a trigger gesture to generate a work unit record may include a thumbs-up gesture and/or other gestures conveying a desire to do something they are talking about. By way of non-limiting illustration, a trigger gesture and/or emote to generate a work unit record with low priority may include a shaking of the head and/or other gestures conveying a desire to do something but having little importance.

In some implementations, triggers in visual content in image files may include one or more trigger features. The trigger features may indicate a user's request, desire, inquiry, and/or need. By way of non-limiting illustration, a trigger feature in a photograph of a physical document may include words written on the physical document. Natural language processing may be performed on the words to determine the content of the words.

In some implementations, the content information characterizing the content of digital assets may include context information specifying context of the digital assets. The context may include one or more of an uploader of a digital asset (e.g., user who input the digital asset), a creator of a digital asset, a page of the collaboration environment from which the user accessed the user interface to input of the digital assets, a time and/or date associated with the input of a digital asset, and/or other information. In some implementations, the individual work unit records may be further generated based on the context information. By way of non-limiting illustration, the context information may be used to set individual values of one or more parameters.

The work creation component 114 may be configured to identify one or more of the users linked to a digital asset. The one or more users linked to the digital asset may include one or more of the creator of the digital asset, the uploader of the digital asset, and/or other users. The work creation component 114 may be configured to obtain the user records for the users linked to the digital asset.

In some implementations, an uploader of a digital asset may be identified. The user record of the uploader may be accessed and/or obtained to gather further information about the uploader. A generated work unit record may include values determined based on the identity of the uploaded. By way of non-limiting illustration, the uploader may be specified as one or more of an assignee of the work unit record, an assignor of the work unit record, a collaborator of the work unit record, a reviewer of the work unit record, and/or used to specify other values. In some implementations, a user linked to, and/or associated with, the uploader may be used to specify one or more values. By way of non-limiting illustration, a user having a subordinate role with respect to the uploader may be an assignee of the work unit record, a user having a superior role with respect to the uploader may be a reviewer of the work unit record, and/or other values may be specified.

In some implementations, a creator of a digital asset may be identified. The creator may be identified based on identifying information included in the content of the digital asset and/or metadata associated with the digital asset. The user record of the creator may be accessed and/or obtained to gather further information about the creator. A generated work unit record may include values determined based on the identity of the creator. By way of non-limiting illustration, the creator may be specified as one or more of an assignee of the work unit record, an assignor of the work unit record, a collaborator of the work unit record, a reviewer of the work unit record, and/or used to specify other values. In some implementations, a user linked to, and/or associated with, the creator may be used to specify one or more values. By way of non-limiting illustration, a user having a subordinate role with respect to the creator may be an assignee of the work unit record, a user having a superior role with respect to the creator may be a reviewer of the work unit record, and/or other values may be specified.

In some implementations, a user may access the user interface to input a digital asset by navigating to the user interface from a page of the collaboration environment. The page may be associated with a record, referred to as a "source record" for the page. The source record may include one or more of a user record, a work unit record, a project record, an objective record, and/or other records. In some implementations, a generated work unit record may be included in the source record. In some implementations, a generated work unit record may be specified as being subordinate to the source record. In some implementations, a generated work unit record may be specified as being superior to the source record. In some implementations, a generated work unit record may be specified as being dependent on, or depending from, to the source record. In some implementations, a generated work unit record may have one or more dates (e.g., due date, review date, and/or other dates) that are specified relative to one or more dates of the source record. By way of non-limiting illustration, the generated work unit record may have a due date that is specified as occurring a specified amount of days before and/or after a due date of the source record.

In some implementations, a time and/or date a digital asset is uploaded may be determined. A generated work unit record may include values determined based on the time and/or date. By way of non-limiting illustration, a due date of the work unit record may be determined relative the time and/or date of the upload. By way of non-limiting illustration, a due date may be specified as being given period of time following the time and/or date of upload.

By way of non-limiting illustration, work creation component 114 may be configured to generate a first work unit record based on the first content information and/or other information. Generating the first work unit record based on the first content information may include generating a first set of values for the work unit parameters. The first set of values may be determined from the characterization of the first set of content of the first digital asset. The first set of values may include a first value of a first work unit parameter. The first work unit parameter may include a title parameter and the first value may include a title extracted from a document file. In some implementations, a title of the first unit of work may be the first text and/or a portion of the first text. The first set of values may include a second value of a second work unit parameter. The second work unit parameter may include an assignee parameter. The second value may include a user who uploaded the first digital asset.

In some implementations, the environment state component 108 may be configured to, in response to the generating records, generate and/or store resource information in individual records. The resource information may include the digital assets and/or resource identifiers that facilitate access to the digital assets. A resource identifier may include one or more of a pointer, a hyperlink, and/or other identifier configured to provide access to an individual record (e.g., a source record and/or other record).

Storing the resource information in the individual records may cause individual resource identifiers to be presented in individual pages of the individual records.

In some implementations, environment state information may be updated as users continue to interact with the collaboration environment via the user interfaces over time. The environment state component 108 may store and/or archive the environment state information periodically and/or based on user request to archive. In some implementations, the environment state component 108 may store historical environment state information specifying historical user information, historical work information, historical project information, historical objective information, user interaction history, and/or other information.

Although one or more implementations herein describe the user interface component 110 in connection with effectuating presentation of a user interface on client computing platform(s) 104, this is for illustrative purposes only and is not to be considered limiting. In some implementations, one or more features and/or functionally of system 100 may be extended to external resource(s) (e.g., other application(s)) through an application programming interface (API). By way of non-limiting illustration, external resource(s) may be tasked with defining and/or presenting a user interface to receive user input. Accordingly, the user interface may be considered external to system 100 (e.g., not managed or provided by system 100). Automatically generating records may be effectuated by performing one or more API interactions with an external resource. An API interaction to achieve the extensibility between features and/or functionally of system 100 and external resource(s) may include one or more of Remote Procedure Call, Representational State Transfer, GraphQL, and/or other interactions. Through this type of arrangement, the features and/or functionality of system 100 may be provided as a service that other developers can incorporate into their applications.

Figure 3:
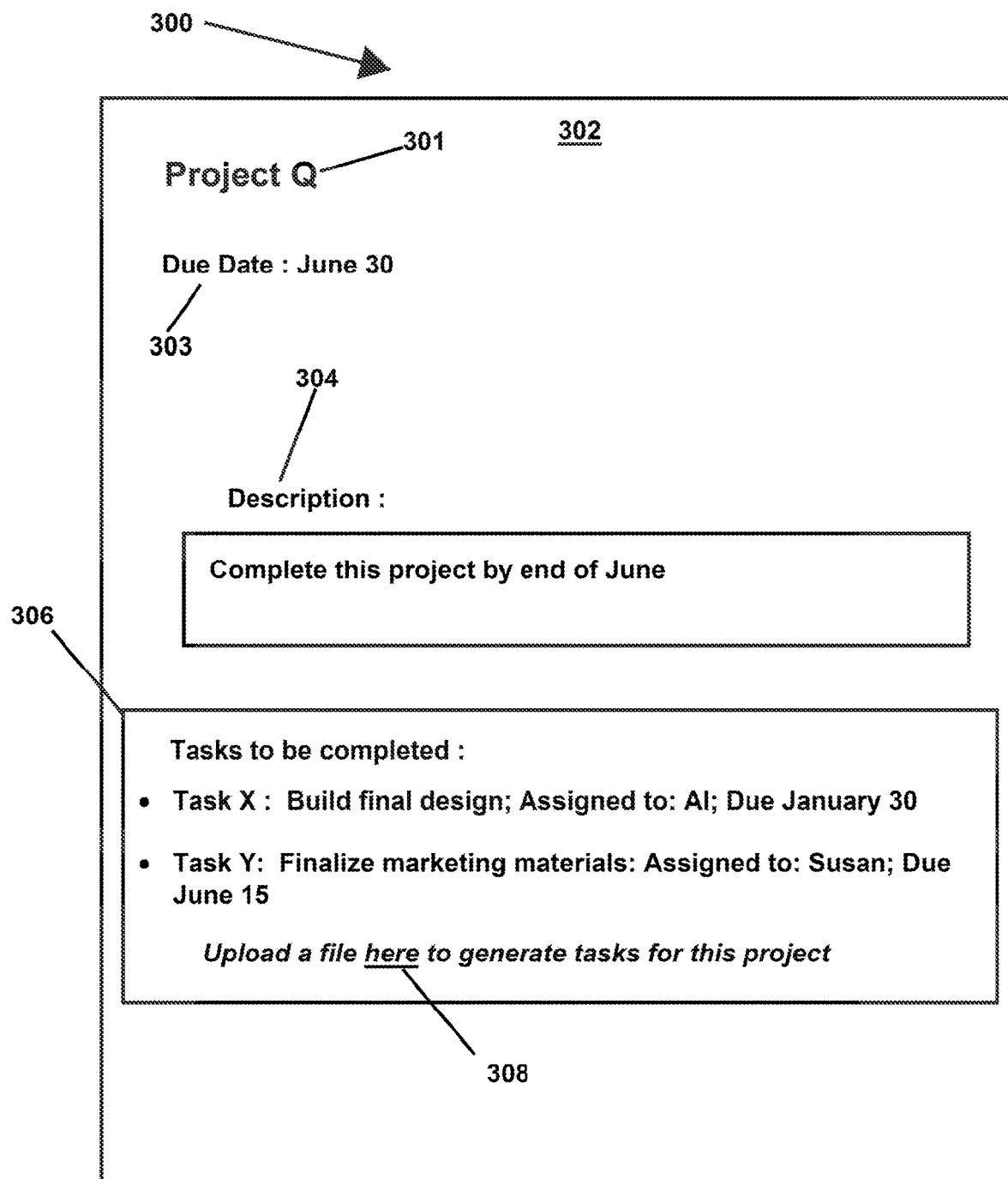
FIG. 3 illustrates a user interface, in accordance with one or more implementations.

FIG. 3 illustrates a user interface 300 of a collaboration environment, in accordance with one or more implementations. The user interface 300 may include a view of a collaboration environment. In particular, the user interface 300 may comprise a project page 302 for a project 301. The user interface 300 may display different values of one or more project parameters of the project, and/or other information. By way of non-limiting illustration, a user interface element 301 may display a title of the project 301 (e.g., Project Q). A user interface element 303 may display a due date of the project 301. A user interface element 304 may display a description of the project 301. A user interface element 306 may display a sets of units of work that support the project 301 (represented as Task X and Task Y). The project page 302 may include a user interface element 308 to initiate user uploads of digital assets to generate one or more work unit records.

Figure 4:
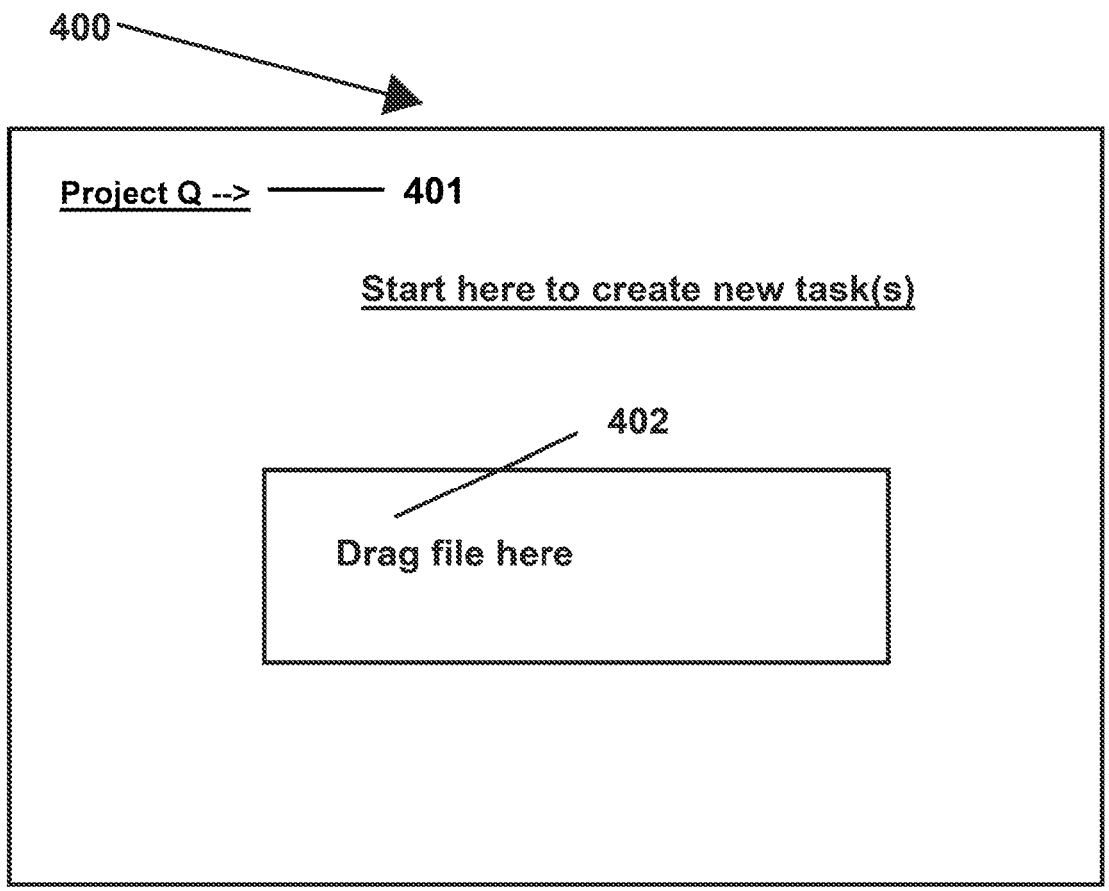
FIG. 4 illustrates a user interface, in accordance with one or more implementations.

FIG. 4 illustrates a user interface 400, in accordance with one or more implementations. The user interface 400 may be user interface through which users upload digital assets to generate work unit records. The user interface 400 may include an input portion 402 configured to receive user input of individual digital assets. The user interface 400 may include a user interface element 401 that provides access to a page of the collaboration from which the user interface 400 was accessed. By way of non-limiting illustration, based on selection of element 308 in FIG. 3, user interface 400 may be presented. The project record for Project Q in FIG. 3 may act as a source record for the subsequent creation of one or more work unit records.

A user may input a digital asset into input portion 402, for example, an audio file of meeting or a dictation. Processing of the audio file may characterize content of the meeting or dictation. By way of non-limiting illustration, the content may be characterized as identifying the Project Q, identifying the subject of one of the tasks of Project Q (see Task X in FIG. 3), identifying needs and/or desires of a speaker, identifying a named person, and/or other characterizations. By way of non-limiting illustration, the meeting or dictation may include one or more users speaking about the subject matter of Task X (finalizing a product design), and the need for a follow up task for a user, Bob, to test the final design, and/or other content.

Figure 5:
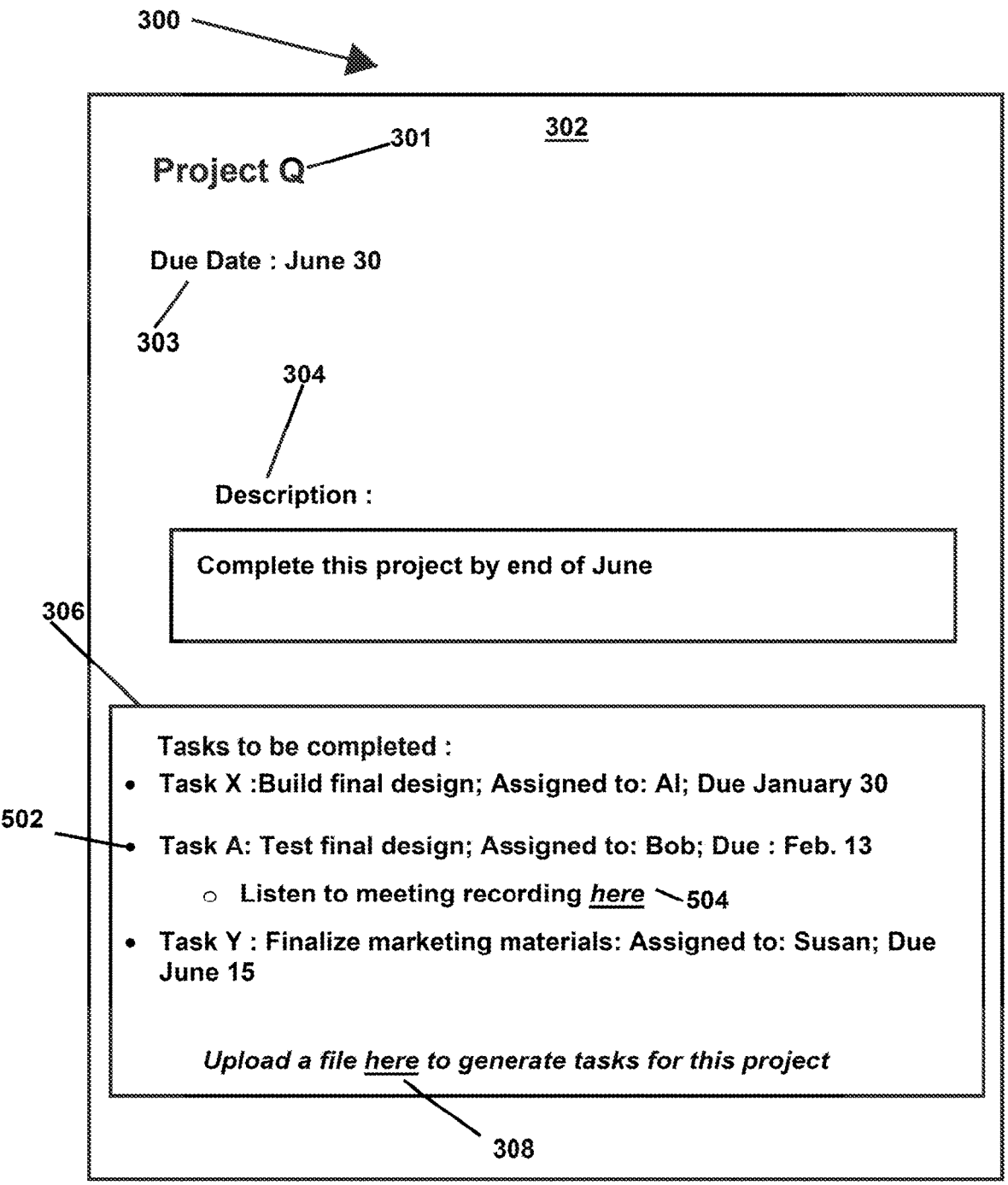
FIG. 5 illustrates a user interface, in accordance with one or more implementations.

FIG. 5 shows the project page 302 in response to creation of one or more work unit records based on the uploaded digital asset. By way of non-limiting illustration, a work unit record for a unit of work 502 ("Task A") may be created. One or more values of one or more parameters may be specified. By way of non-limiting illustration, an assignee may be "Bob"; a description may be "Test final design"; a due date may be set; and/or other information may be specified. In some implementations, the due date may be specified relative to one or more other records linked to the source record. By way of non-limiting illustration, the due date for unit of work 502 may be set for two weeks following the due date of Task X. Further, the project page 302 may include a link 504 to the digital asset, which may be stored in the new work unit record and/or other record following upload.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112 and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
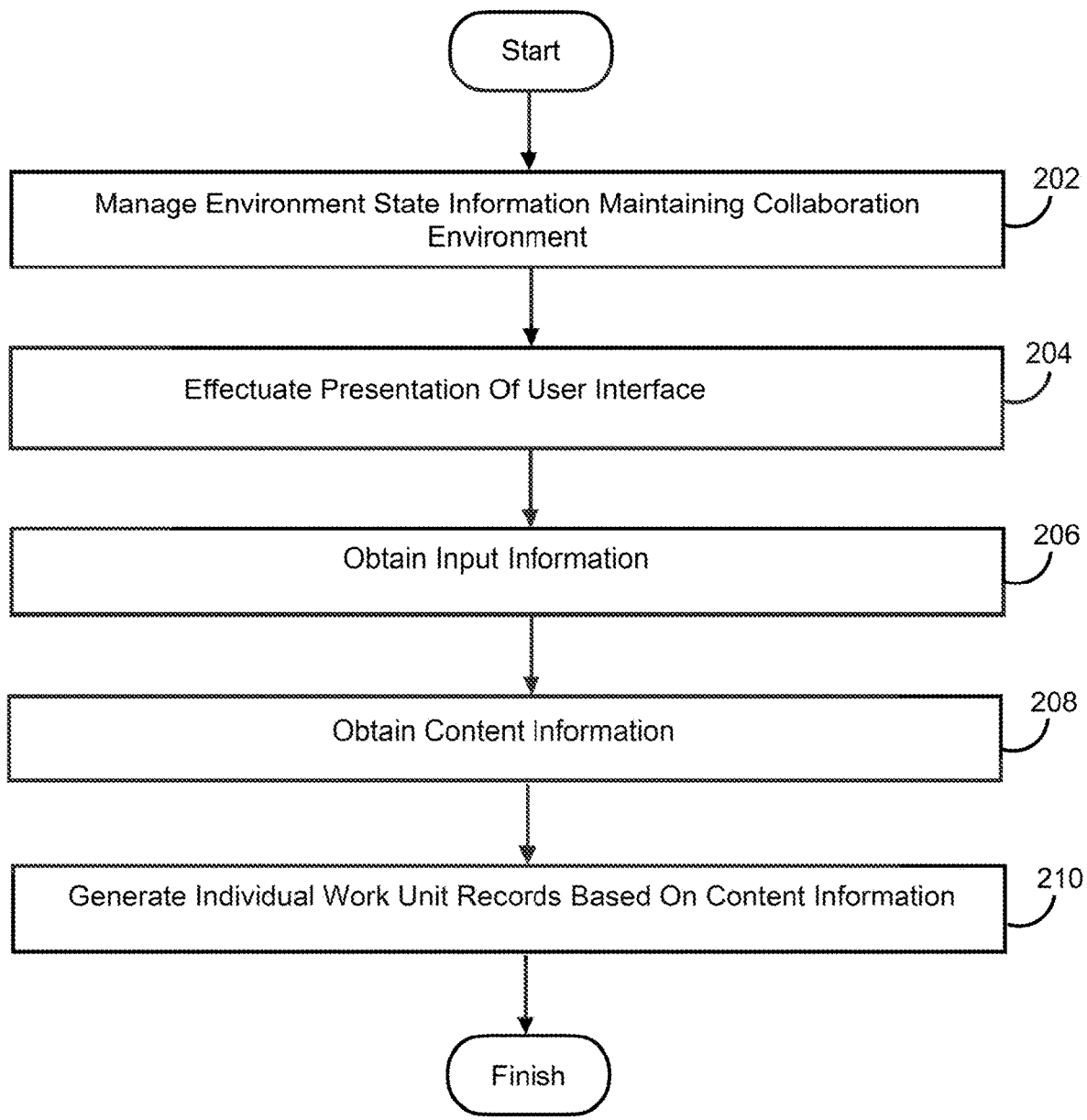
FIG. 2 illustrates a method to generate records within a collaboration environment, in accordance with one or more implementations.

FIG. 2 illustrates a method 200 to generate records within a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include one or more records. The one or more records may include work units records and/or other records. The work unit records may include work information and/or other information. The work information may characterize units of work created, managed, and/or assigned to within the collaboration environment to the users who are expected to accomplish one or more actions to complete the units of work. The work information may comprise values of work unit parameters characterizing the units of work. Operation 202 may be performed by one or more hardware processors configured by machine-readable instructions including a component that is the same as or similar to environment state component 108, in accordance with one or more implementations.

An operation 204 may effectuate presentation of a user interface through which users upload digital assets representing sets of content. The user interface may include one or more portions. The one or more portions may include an input portion. The input portion may be configured to receive user input of individual ones of the digital assets. Operation 204 may be performed by one or more hardware processors configured by machine-readable instructions including a component that is the same as or similar to user interface component 110, in accordance with one or more implementations.

An operation 206 may obtain input information defining the digital assets input via the user interface. The input information may define a first digital asset input into the user interface via the input portion. The first digital asset may present a first set of content. Operation 206 may be performed by one or more hardware processors configured by machine-readable instructions including a component that is the same as or similar to user interface component 110, in accordance with one or more implementations.

An operation 208 may, in response to obtaining the input information, obtain and/or generate content information characterizing the sets of content represented in the digital assets. By way of non-limiting illustration, responsive to obtaining the input information defining the first digital asset, first content information may be generated which characterizes the first set of content of the first digital asset. Operation 208 may be performed by one or more hardware processors configured by machine-readable instructions including a component that is the same as or similar to content component 112, in accordance with one or more implementations.

An operation 210 may generate individual ones of the work unit records based on the content information and/or other information. The individual ones of the work unit records may be generated by determining sets of values for the work unit parameters. The sets of values may be determined from the characterization of the sets of content represented in the digital assets, and/or other information. By way of non-limiting illustration, a first work unit record may be generated based on the first content information and/or other information. The first work unit record may include a first set of values for the work unit parameters determined from the characterization of the first set of content. Operation 210 may be performed by one or more hardware processors configured by machine-readable instructions including a component that is the same as or similar to work creation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to generate work unit records within a collaboration environment, the system comprising:
one or more physical processors configured by machine-readable instructions to:
manage environment state information maintaining a collaboration environment, the collaboration environment being configured to facilitate interaction by users with the collaboration environment, the environment state information including work unit records, the work unit records including work information characterizing units of work created, managed, and/or assigned within the collaboration environment to the users who are expected to accomplish one or more actions to complete the units of work;
obtain input information defining a digital asset input into a user interface, the digital asset representing a set of content;
in response to obtaining the input information, generate content information characterizing the set of content; and
generate a work unit record based on the content information, the work unit record including an assignee and/or a due date, wherein the assignee is specified as a user who input the digital asset or an other user associated with the user, and wherein the due date is specified relative to an input date when the digital asset was input into the user interface.

2. The system of claim 1, wherein:
the digital asset is a document file, and the set of content includes text comprising words and/or phrases;
generating the content information includes performing natural language processing on the text; and
generating the work unit record based on the content information includes specifying characteristics of the work unit record based on the words and/or phrases.

3. The system of claim 1, wherein:
the digital asset is an image file, and the set of content includes visual content;
generating the content information includes performing feature detection on the visual content to characterize features in the visual content; and
generating the work unit record based on the content information includes specifying characteristics of the work unit record based on the features in the visual content.

4. The system of claim 1, wherein:
the digital asset is a video file, and the set of content includes visual content and audio content;
generating the content information includes performing feature detection on the visual content to characterize features in the visual content and performing speech processing on the audio content to characterize utterances in the audio content; and
generating the work unit record based on the content information includes specifying characteristics of the work unit record based on the features in the visual content and the utterances in the audio content.

5. The system of claim 1, wherein the one or more physical processors are further configured by the machine-readable instructions to identify one or more triggers included in the set of content that cause generation of the work unit record.

6. The system of claim 1, wherein the content information characterizing the set of content includes context information specifying context of the digital asset, the context including one or more users linked to digital asset.

7. The system of claim 6, wherein the one or more physical processors are further configured by the machine-readable instructions to:
   identify individual ones of the one or more users linked to the digital asset;
   obtain individual user records for the individual ones of the one or more users; and
   generate the work unit record further based on the individual user records.

8. The system of claim 1, wherein the other user includes a user of a given role.

9. The system of claim 1, wherein the work unit record is generated to include the assignee, such that a user interface page associated with the work unit record displays the assignee.

10. The system of claim 1, wherein the work unit record is generated to include the due date, such that a user interface page associated with the work unit record displays the due date.

11. A method to generate work unit records within a collaboration environment, the method comprising:
   managing environment state information maintaining a collaboration environment, the collaboration environment being configured to facilitate interaction by users with the collaboration environment, the environment state information including work unit records, the work unit records including work information characterizing units of work created, managed, and/or assigned within the collaboration environment to the users who are expected to accomplish one or more actions to complete the units of work;
   obtaining input information defining a digital asset input into a user interface, the digital asset representing a set of content;
   in response to obtaining the input information, generating content information characterizing the set of content; and
   generating a work unit record based on the content information, the work unit record including an assignee and/or a due date, wherein the assignee is specified as a user who input the digital asset or an other user associated with the user, and wherein the due date is specified relative to an input date when the digital asset was input into the user interface.

12. The method of claim 11, wherein:
   the digital asset is a document file, and the set of content includes text comprising words and/or phrases;
   the generating the content information includes performing natural language processing on the text; and
   the generating the work unit record based on the content information includes specifying characteristics of the work unit record based on the words and/or phrases.

13. The method of claim 11, wherein:
   the digital asset is an image file, and the set of content includes visual content;
   the generating the content information includes performing feature detection on the visual content to characterize features in the visual content; and
   the generating the work unit record based on the content information includes specifying characteristics of the work unit record based on the features in the visual content.

14. The method of claim 11, wherein:
   the digital asset is a video file, and the set of content includes visual content and audio content;
   the generating the content information includes performing feature detection on the visual content to characterize features in the visual content and performing speech processing on the audio content to characterize utterances in the audio content; and
   the generating the work unit record based on the content information includes specifying characteristics of the work unit record based on the features in the visual content and the utterances in the audio content.

15. The method of claim 11, further comprising identifying one or more triggers included in the set of content that cause generation of the work unit record.

16. The method of claim 11, wherein the content information characterizing the set of content includes context information specifying context of the digital asset, the context including one or more users linked to digital asset.

17. The method of claim 16, further comprising:
   identifying individual ones of the one or more users linked to the digital asset;
   obtaining individual user records for the individual ones of the one or more users; and
   generating the work unit record further based on the individual user records.

18. The method of claim 11, wherein the other user includes a user of a given role.

19. The method of claim 11, wherein the work unit record is generated to include the assignee, such that a user interface page associated with the work unit record displays the assignee.

20. The method of claim 11, wherein the work unit record is generated to include the due date, such that a user interface page associated with the work unit record displays the due date.

* * * * *